June 25, 1940. E. RICARD 2,205,542
PROCESS FOR THE MANUFACTURE OF FORMALDEHYDE BY ELECTROSYNTHESIS
FROM CARBON MONOXIDE AND HYDROGEN
Filed Dec. 24, 1936
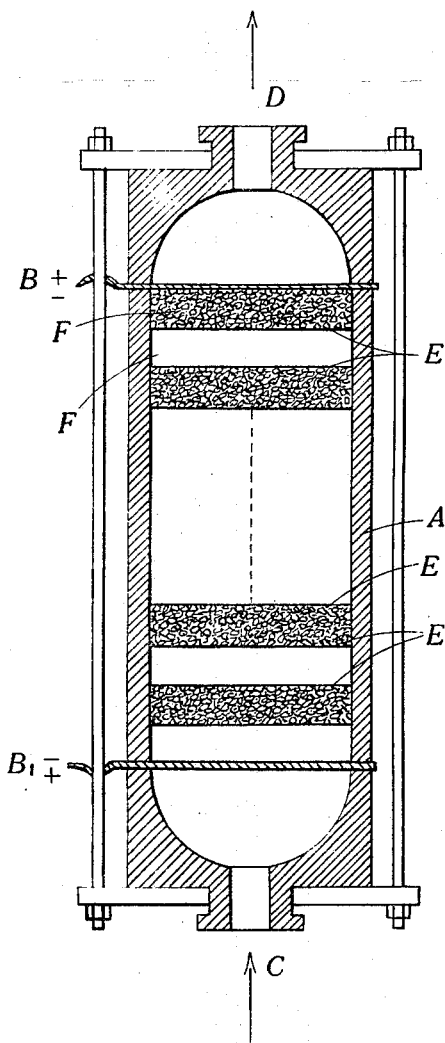
INVENTOR
Eloi Ricard
BY
E. F. Windcroft
ATTORNEY Patented June 25, 1940

2,205,542

UNITED STATES PATENT OFFICE 2,205,542

PROCESS FOR THE MANUFACTURE OF FORMALDEHYDE BY ELECTROSYNTHESIS FROM CARBON MONOXIDE AND HYDROGEN

Eloi Ricard, Melle, France, assignor to Les Usines de Melle, Melle, France, a corporation of France Application December 24, 1936, Serial No. 117,614
In France December 24, 1935

4 Claims. (Cl. 204—31)

This invention relates to the manufacture of formaldehyde by electrosynthesis from carbon monoxide and hydrogen.

It is known that when a gaseous mixture of carbon monoxide and hydrogen is passed through an electrical discharge field, traces of formaldehyde are formed. It is also known that it has been attempted to obtain greater yields of formaldehyde by lowering the pressure of the gases to 0.5 atmosphere absolute, but that these attempts have given negative results.

I have found that more satisfactory yields are obtained when the pressure of the gases is reduced to less than 0.15 atmosphere absolute. Seeing that it is at this pressure that anodic glow appears, one is led to believe that it is this anodic glow itself, and not the electric discharge as has previously been believed, that plays the preponderant part in the electrosynthesis of formaldehyde.

The present invention therefore may be stated as consisting essentially in effecting the electrosynthesis of formaldehyde from carbon monoxide and hydrogen under the influence of anodic glow or alternatively at a gas pressure of less than 0.15 atmosphere.

Experiment has shown that, in addition, it is advantageous to choose a charge of between 0.05 and 0.3 milli-amperes per square centimetre of cross-sectional area of the reaction tube.

Moreover, I have found that the yields obtained under the conditions set forth above may be increased still further if there be arranged, between the two electrodes, i. e., inside the discharge field, a solid body which possesses the power of absorbing gaseous formaldehyde—e. g. active charcoal or silica gel.

The following non-limitative example described with reference to the accompanying diagrammatic drawing will enable the nature of the invention and the manner in which it may be carried out to be well understood:

*Example*

The discharge apparatus consists essentially of a porcelain column A having a diameter of about 16 cms. and divided, by means of perforated plates E, into a series of cells F which are alternately devoid of and filled with absorbent charcoal. Only the cells at the top and at the bottom have been represented in the drawing.

At the two ends of the column, there are arranged two silver electrodes B and $B_1$ which are spaced at a distance of about 40 cms. from each other and between which there is a difference of alternating voltage of the order of 20,000 volts, the discharge current being 20 milli-amperes.

An equi-molecular mixture of carbon monoxide and hydrogen is passed into the column through the pipe C at the rate of 166 litres per minute under a pressure of one tenth of an atmosphere. Under these conditions, 10 per cent of the energy employed is converted into chemical energy so that the hourly production is increased to 25 gms. of gaseous formaldehyde which are absorbed by the charcoal in the form of polyoxymethylene.

The residual gases which escape through the pipe D and which always consist of an equimolecular mixture of carbon monoxide and hydrogen are again put back into circuit through the pipe C along with the original mixture, so that finally the conversion is complete.

The reacting gases may be derived from any suitable source and in the case of the carbon monoxide it may be produced by starting with carbon dioxide and reducing it to monoxide by using excess of hydrogen.

What I claim is:

1. The process of preparing formaldehyde which comprises introducing carbon monoxide and hydrogen into an electric glow discharge zone while maintaining a gas pressure of less than 0.15 atm. absolute and thereby effecting a reaction between the carbon monoxide and hydrogen with the formation of formaldehyde.

2. A process according to claim 1 in which formaldehyde produced is absorbed within the discharge field by means of absorbent material positioned therein.

3. A process according to claim 1 wherein the discharge is energized with a current of from 0.05 to 0.3 milliampere per square centimeter of cross-sectional area of the reaction space between the electrodes.

4. A process according to claim 1 wherein formaldehyde produced is absorbed inside the discharge field by means of absorbent material positioned therein, said absorbent material being selected from the group consisting of silica gel and charcoal.

ELOI RICARD.